United States Patent [19]

Kanaya

[11] Patent Number: 5,220,373
[45] Date of Patent: Jun. 15, 1993

[54] ELECTROPHOTOGRAPHIC PROCESS CONTROL DEVICE USING A NEURAL NETWORK FOR ESTIMATING STATES OF THE DEVICE

[75] Inventor: Mitsuhisa Kanaya, Tokyo, Japan

[73] Assignee: Ricoh Company, Ltd., Tokyo, Japan

[21] Appl. No.: 855,509

[22] Filed: Mar. 20, 1992

[30] Foreign Application Priority Data

| Mar. 22, 1991 | [JP] | Japan | 3-59010 |
| Mar. 26, 1991 | [JP] | Japan | 3-62089 |
| Mar. 27, 1991 | [JP] | Japan | 3-63457 |
| Feb. 20, 1992 | [JP] | Japan | 4-33713 |

[51] Int. Cl.⁵ .............................................. G03G 15/00
[52] U.S. Cl. .................................... 355/204; 355/208; 395/11; 395/22; 395/900
[58] Field of Search ............. 355/204, 208; 395/11, 395/22, 900

[56] References Cited

U.S. PATENT DOCUMENTS 5,109,275  4/1992  Naka et al. ................... 395/22 X
5,121,467  9/1992  Skeirik ........................... 395/11

FOREIGN PATENT DOCUMENTS 2-311860  12/1990  Japan ............................ 355/208

Primary Examiner—Joan H. Pendegrass
Attorney, Agent, or Firm—Oblon, Spivak, McClelland, Maier & Neustadt

[57] ABSTRACT

An electrophotographic process control device for an electrophotographic image forming apparatus. A neural network is incorporated in the control device for estimating the state of the image forming unit. Parameters of the kind which should not be frequently measured, e.g., the surface potential of a photoconductive element and the amount of toner deposition thereon and parameters which are not easy to measure are determined by inference so as to control each section of the apparatus in an optimum way.

9 Claims, 16 Drawing Sheets

IDEAL REFERENCE PATTERN

ACTUALLY REFERENCE PATTERN a ⋯⋯▶ INSTRUCTION VALUE (MEASURABLE ONLY DURING LEARNING)

b ⇨ SUBSTITUTE FOR DIRECTLY UNMEASURABLE VALUE c ▶ DIRECTLY MEASURABLE VALUE

ELECTROPHOTOGRAPHIC PROCESS CONTROL DEVICE USING A NEURAL NETWORK FOR ESTIMATING STATES OF THE DEVICE

BACKGROUND OF THE INVENTION

The present invention relates to an image forming apparatus for copying or printing an image by an electrophotographic process and an image forming unit incorporated therein and, more particularly, to an electrophotographic process control device for controlling each part of an electrophotographic process.

A copier, laser printer, LED (Light Emitting Diode) printer, facsimile transceiver or similar image forming apparatus of the type copying or printing an image by an electrophotographic process including charging, exposure, development, image transfer and fixation is conventional. The prerequisite with this type of apparatus is to control each part of the electrophotograhic process in an optimum way for forming an attractive image. Typical of conventional control methods is one using look-up tables. Specifically, this kind of control method measures the surface potential of a photoconductive drum and an amount of toner deposition by a surface potential meter and a photosensor, respectively. Look-up tables list optimum manipulation amount data relating to some different states of the apparatus which were determined by, for example, experiments. To control the electrophotographic process, the look-up tables are referenced to select manipulation data, i.e., a manipulation amount of toner supply and that of a bias voltage matching the above-mentioned measured values. Another conventional method changes the manipulation amounts of various sections inside of the apparatus and finds optimum operation amounts by conventional PID (Proportional, Integral and Differential) or similar control while feeding back the outputs of sensors disposed in the apparatus. Still another conventional control method uses a computing device having a fuzzy inference capability and manipulates each subject of control by total decision on the complicated tangle of numerous state parameters.

However, the conventional electrophotographic process control methods discussed above have some problems left unsolved, as follows. First, with the look-up table scheme, it is extremely difficult to determine an optimum manipulation amount for all the possible states of the apparatus. Specifically, conductive experiments by assuming all the possible states of the apparatus, including environmental condition, and holding tables listing all the resulting operation amount data in the apparatus is not practical. To cover all the expected states of the apparatus, a prohibitive amount of experiments and a prohibitive amount of data are needed. In light of this, it has been customary to list only acceptable manipulation amounts relating to typical states of the apparatus. This prevents optimum control from being effected in all the states of the apparatus. Moreover, the manipulation amounts have to be provided with some margins (errors) to cope with the scattering among machines (image forming units) ascribable to the production line, making it extremely difficult to effect optimum control in various states.

On the other hand, parameters representative of the state of the apparatus include, for example, the surface potential of a photoconductive drum and the amount of toner deposition on the drum which should not be frequently measured. In practice, therefore, the repetitive feedback scheme using PID control, for example, is difficult to execute. Specifically, it is a common practice with this kind of scheme to measure the surface potential of a photoconductive element and the amount of toner deposition and to change the voltage, current or similar manipulation value to be applied to a charger or a light source by, for example, PID control while feeding back the measured values. Such a procedure is repeated until the surface potential and the amount of toner deposition converge to respective target values. However, the problem is that the surface potential and the amount of toner deposition cannot be frequently measured. For example, assume a latent image is electrostatically formed on a photoconductive drum. To measure the surface potentials of the light (charged) and dark (exposed) portions of such a latent image, a reference latent image pattern for measurement is formed on the drum, and then the surface potential is measured in each of the charged and exposed portions (and some halftone portions, if necessary). Hence, the latent image pattern is developed without exception due to the inherent process, i.e., a toner is deposited on the drum. Should such a toner image have an excessively high density, it would critically increase the load on a cleaning unit and, in the worst case, make cleaning impossible unless the toner image is transferred to a paper sheet or similar recording medium. Transferring the reference toner image to a paper sheet would invite not only the waste of paper sheets but also the increase in the number of processing steps. Therefore, to protect the cleaning unit, the reference toner image should have a relatively low density or should be formed as scarcely as possible. In addition, the reference toner pattern aggravates toner consumption.

The amount of toner deposition on the photoconductive drum, too, cannot be measured unless the above-stated reference toner pattern is formed on the drum, again resulting in the cleaning problem. The allowable frequency of measurement is, therefore, limited. Moreover, the sequence of charging, exposing, developing and cleaning steps indispensable for the measurement is time-consuming. It follows that the repetitive measurement degrades the performance, i.e., copying or printing speed of the apparatus itself while increasing the interval between the first copy and the print output.

Since the parameters for determining manipulation amounts depend on one another in a complicated way, it is difficult to converge the control with the PID algorithm or similar conventional relatively simple algorithm.

The limitation on the measurement of the surface potential discussed above is, of course, true with the conventional fuzzy computation scheme also, since such control is not practicable unless the surface potential is known.

SUMMARY OF THE INVENTION

It is, therefore, an object of the present invention to provide an electrophotographic process control device which realizes an image forming apparatus capable of producing images of high quality despite the parameters which cannot be frequently measured and the parameters which are difficult to measure.

In accordance with the present invention, an image forming process control device for determining an optimum manipulation amount for image formation in an image forming apparatus comprises a measuring section for measuring the state of each section of the image forming apparatus, a preprocessing section for converting information fed from the measuring means to parameters representative of a given state, a state estimating section comprises a neural network having performed predetermined learning beforehand, the state estimating section receiving the parameters and information relating to a manipulation amount at an input layer of the neural network and outputting an estimated state of a particular section of the image forming apparatus via an output layer of the neural network, a state comparing section for comparing an output of the state estimating section with a target state of the particular section, and a manipulation amount determining section for producing a deviation of a manipulation amount from the present manipulation amount on the basis of an output of the state comparing section, delivering the deviation to the state estimating section, and adding, when the result of comparison has converged, the deviation to the present manipulation amount to thereby produce an optimum manipulation amount.

Also, in accordance with the present invention, an electrophotographic process control device for an image forming apparatus which forms an image by an electrophotographic process comprises a measuring section for measuring the internal and external states of the image forming apparatus, a preprocessing section for converting the internal and external states from the measuring section and manipulation amount information associated with the interior of the image forming apparatus to parameters representative of a state of the image forming apparatus, a state estimating section for inferring a state of the image forming apparatus by a neural network which receives the parameters and has learned the characteristics of a system of the image forming apparatus beforehand by use of parameters determined by experiments as instruction values, a state comparing section for comparing the state inferred by the state measuring section and a target state for control, and a manipulation amount determining section for determining an optimum manipulation amount for each section of the image forming apparatus.

Further, in accordance with the present invention, an image forming apparatus for forming an image by an electrophotographic process comprises a preprocessing section for measuring the internal and external states of the image forming apparatus and converting the resulting information to parameters representative of a state, a state estimating section comprising a neural network which has learned the characteristics of a system of the image forming apparatus by use of parameters representative of states and determined by experiments as instruction values, and a manipulation amount determining section for determining a manipulation amount to be sent to each control section, which controls an associated section of the image forming apparatus, by fuzzy computation using a state estimated by the state estimating section, parameters representative of the internal and external states of the image forming apparatus, information from an operation panel of the image forming apparatus, and a present manipulation amount.

In addition, in accordance with the present invention, an electrophotographic process control device for an image forming apparatus which forms an image by an electrophotographic process comprises a state estimating section comprising a neural network which has learned the characteristics of a system of the image forming apparatus beforehand by use of parameters representative of states determined by experiments as instruction values, a preprocessing section for measuring, in a state other than a target state, the internal and external states of the image forming apparatus and producing parameters representative of a state in the target state by using the state estimating section on the basis of the measured internal and external states and substitute information.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
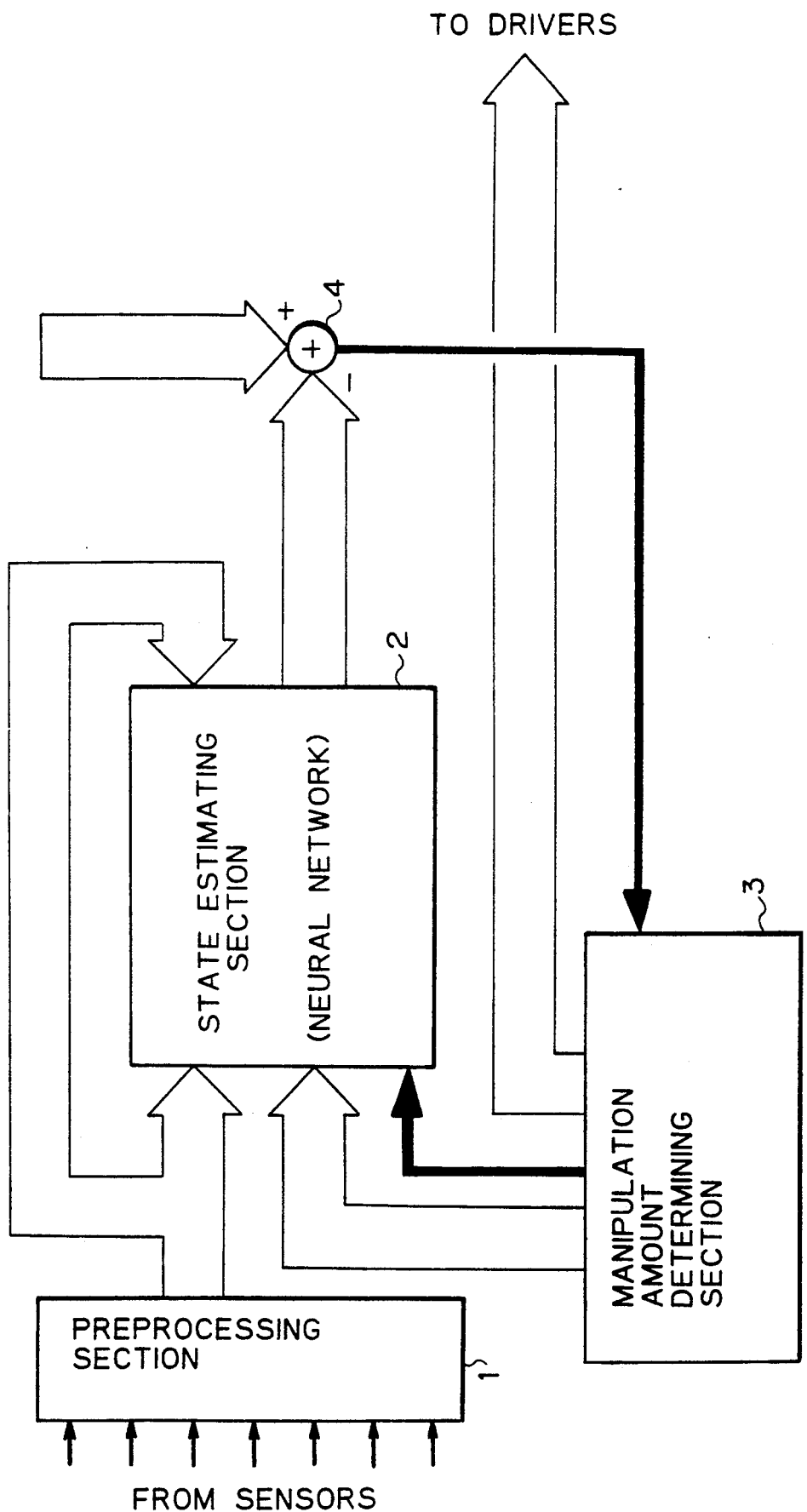
FIG. 1 is a block diagram schematically showing an electrophotographic process control device embodying the present invention.

Referring to FIG. 1 of the drawings, an electrophotographic process control device embodying the present invention is shown. As shown, the control device is generally made up of a preprocessing section 1, a state estimating section 2, a manipulation amount determining section 3, and a state comparing section 4. The preprocessing section 1 generates parameters representative of the states of the inside (e.g. manipulation amounts of a charger and a light source) and outside (e.g. temperature and humidity) of an image forming unit in response to the output of various sensors. The state estimating section 2 estimates and infers the states of various sections constituting the image forming unit by use of a neural network having a learning function. The manipulation amount determining section 3 determines manipulation amounts to be sent to various drivers included in the image forming unit. The state comparing section 4 compares each estimated state with a target state to thereby produce a difference or error. The neural network built in the state estimating section 2 receives present states having parameters representative of the present states of the image forming unit and the manipulation amounts being currently given to the unit and errors thereof and, in turn, estimates the states of the unit which would occur if the manipulation amounts changed by the errors were applied to the apparatus. The neural network is assumed to have learned by a method which will be described and uses instruction values obtained by experiments beforehand.

The control device having the above construction will be operated as follows.

(1) Control

Figure 2:
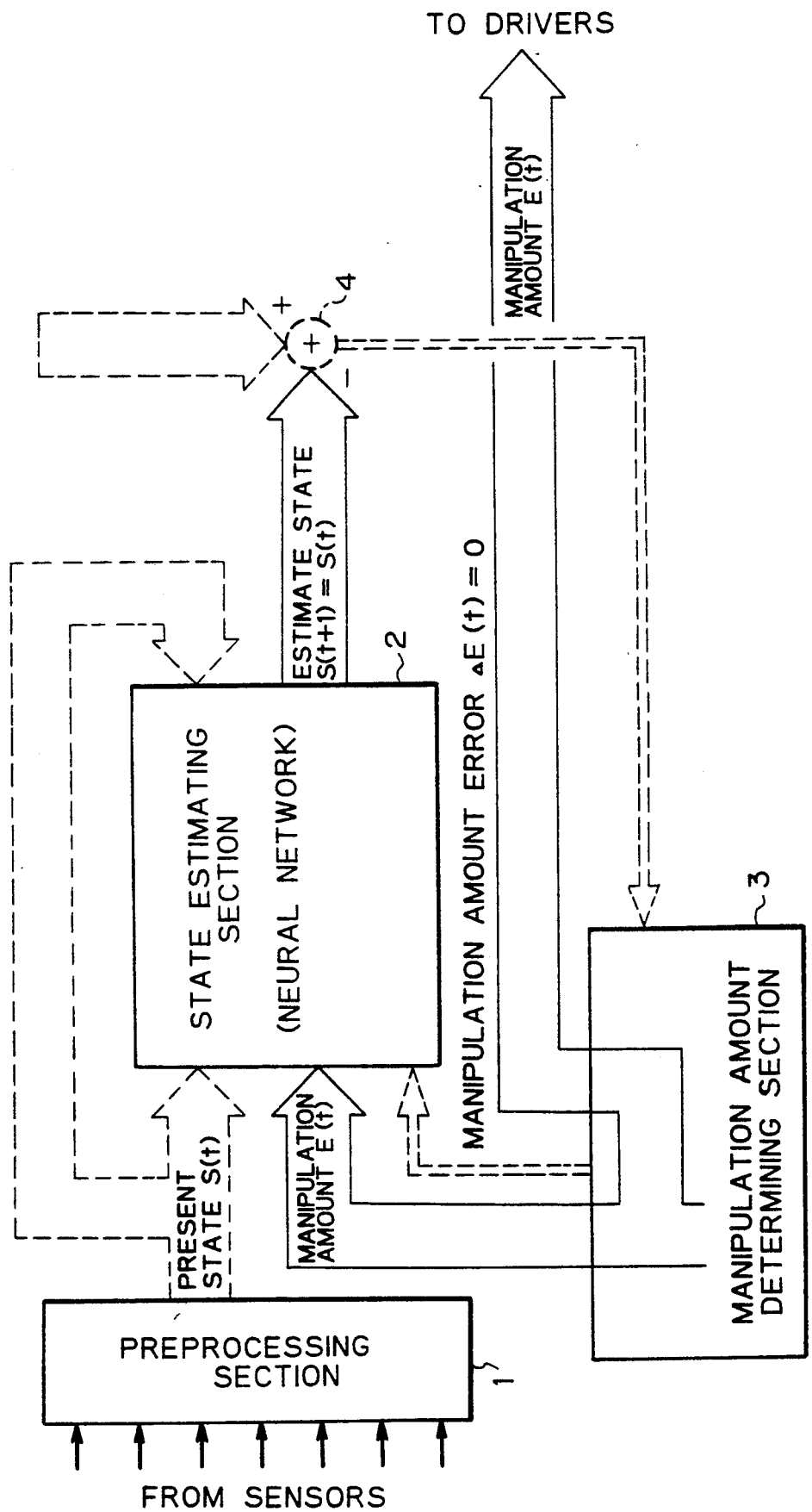
FIGS. 2–4 demonstrate a specific operation of the embodiment.

FIG. 2 shows a specific condition at a time t. Assume that the state of the image forming process generated by the preprocessing section 1 at the time t is S(t), and that the manipulation amount being sent to a driver of the image forming unit is E(t). Further, assume that the state estimating section 2 simulates an electrophotographic process system from the present manipulation amount E(t) and the present state S(t) of the unit and estimates a state s(t+1) which would occur in the unit if the manipulation amount E(t) were changed by an error $\Delta E$. Initially, since the error $\Delta E(t)$ of manipulation amount is zero, the estimated state s(t+1) output from the state estimating section 2 is identical with the present state S(t) (since the manipulation amount is not changed, the state is, of course, estimated not to change).

Figure 3:
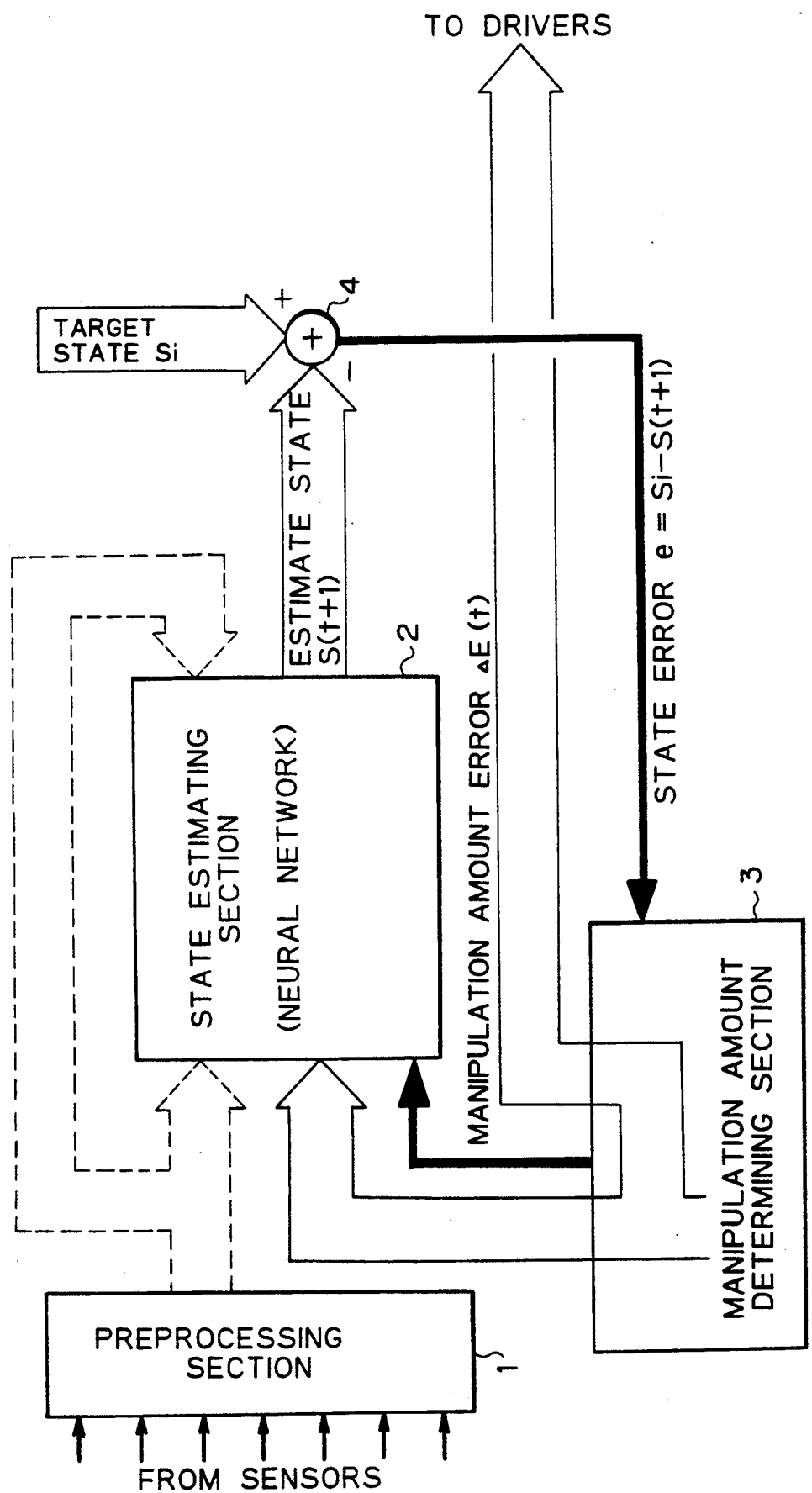

Specifically, assume that temperature has sharply changed to change the internal and external states of the image forming apparatus, so that the manipulation amounts being fed to the drivers of the apparatus should be set, or controlled again. Then, the following steps (i)–(vi) are executed (see FIG. 3).

(i) On receiving the outputs of sensors representative of the internal and external states of the image forming unit, the preprocessing section 1 generates a state S(t), e.g., converts analog data from the sensors to digital data and normalizes values to be applied to the neural network.

(ii) The manipulation amount determining section 3 sets up a manipulation amount error $\Delta E(t)=0$ (initial value) and delivers it to the state estimating section 2.

(iii) In response, the state estimating section 2 estimates and outputs, based on the present state S(t), manipulation amount E(t) and error $\Delta E(t)$, a state s(t+1) of the image forming unit which would occur if the manipulation amount E(t) were changed by the error $\Delta E(t)$.

(iv) The state comparing section 4 compares the estimated state s(t+1) and a predetermined target state Si and delivers the resulting difference or state error e to the manipulation amount determining section 3.

(v) The manipulation amount determining section 3 changes the manipulation amount error $\Delta E(t)$ in such a manner as to reduce the absolute value of the state error e, feeding the resulting error $\Delta E(t)$ to the state estimating section 2.

(vi) The above steps (iii)–(v) are repeated until the state error e becomes minimum or smaller than an allowable upper limit.

Figure 4:
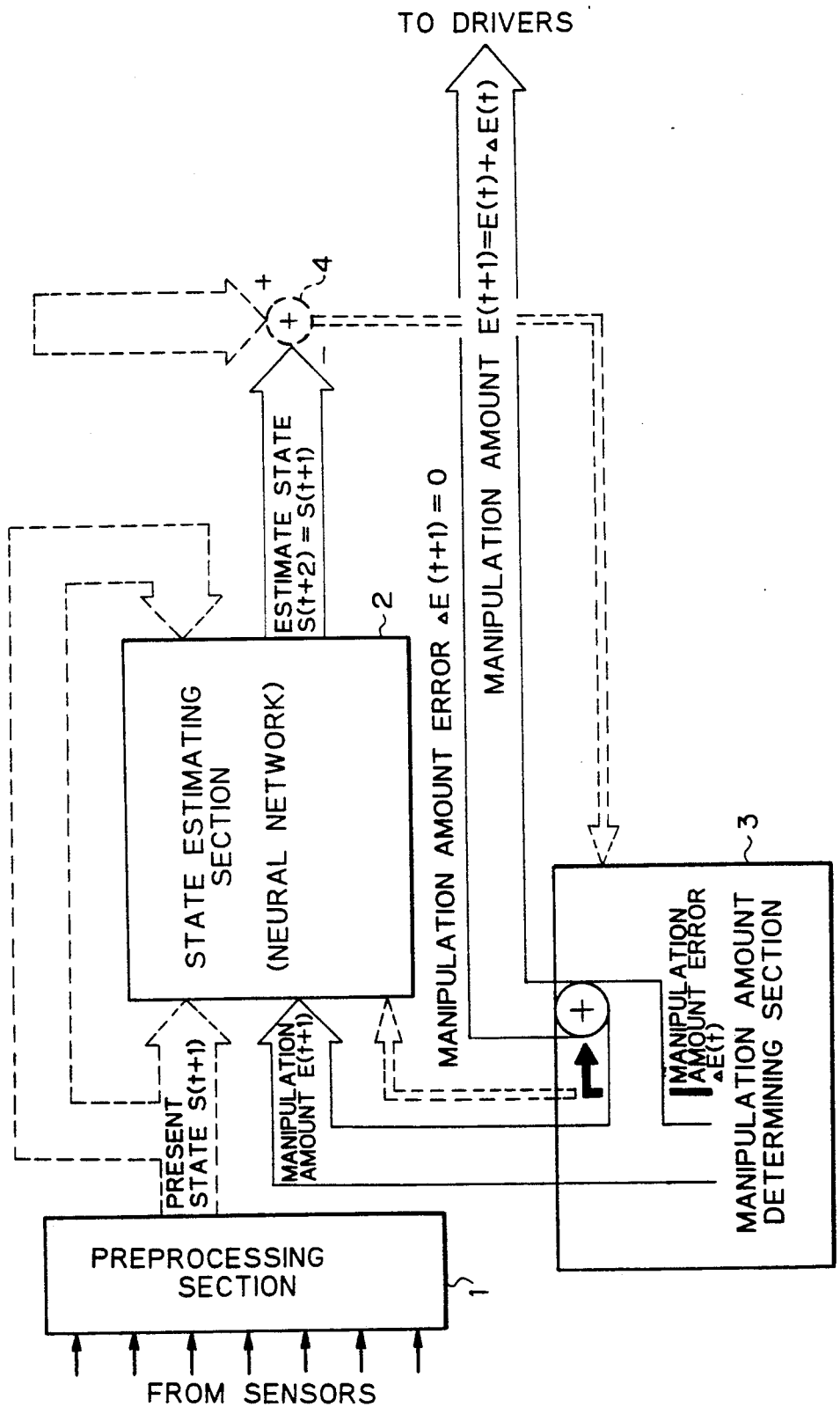

By using $\Delta(t)$ produced when the above procedure converges or when the state error e becomes minimum or smaller than the allowable upper limit, the manipulation amount determining section 3 generates a new manipulation amount $E(t+1)=E(t)+\Delta E(t)$ for a time t+1 and sends it to each driver of the apparatus (see FIG. 4).

Figure 7:
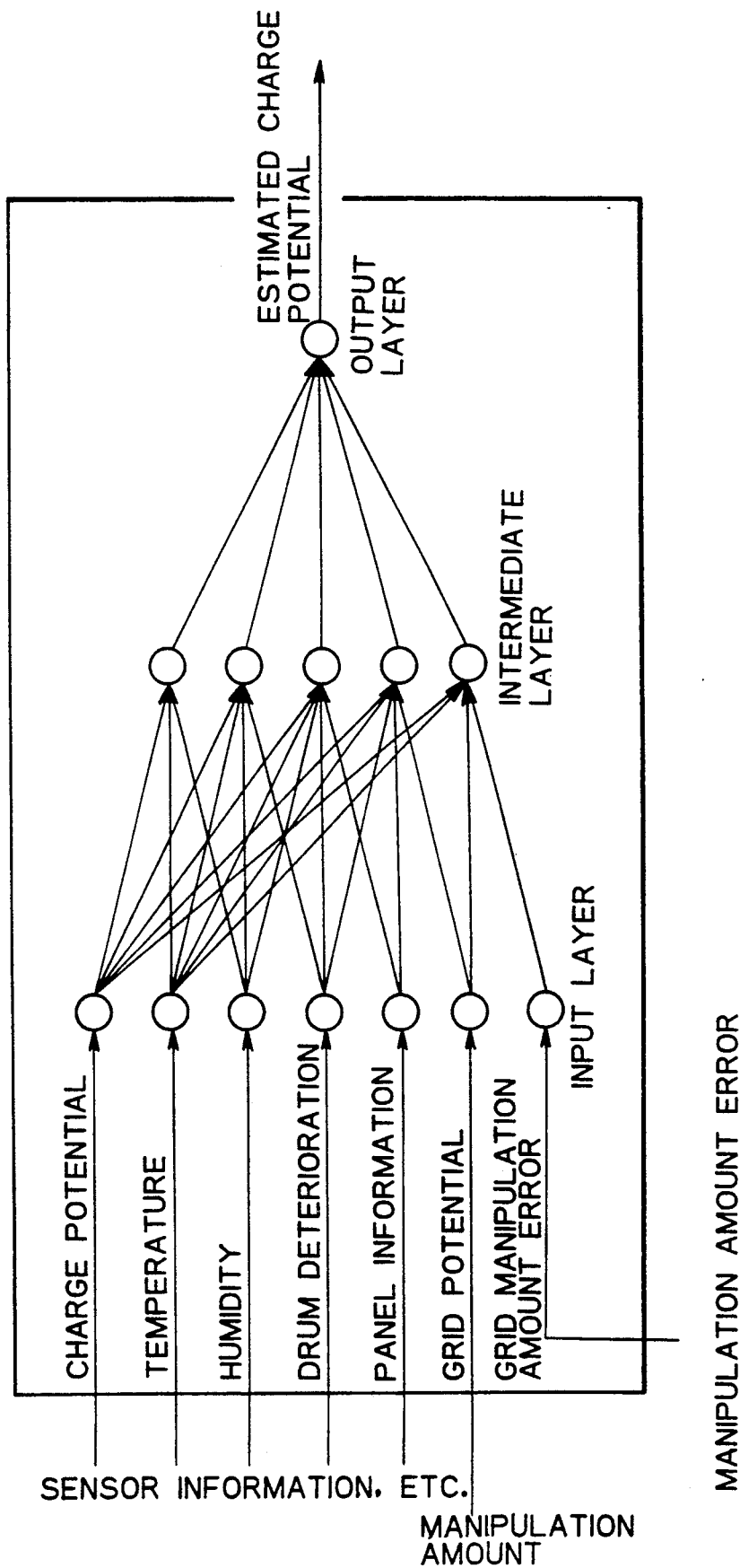
FIG. 7 shows a specific construction of a state estimating section included in the embodiment and implemented by a three-layer hierarchical neural network.
Figure 8:
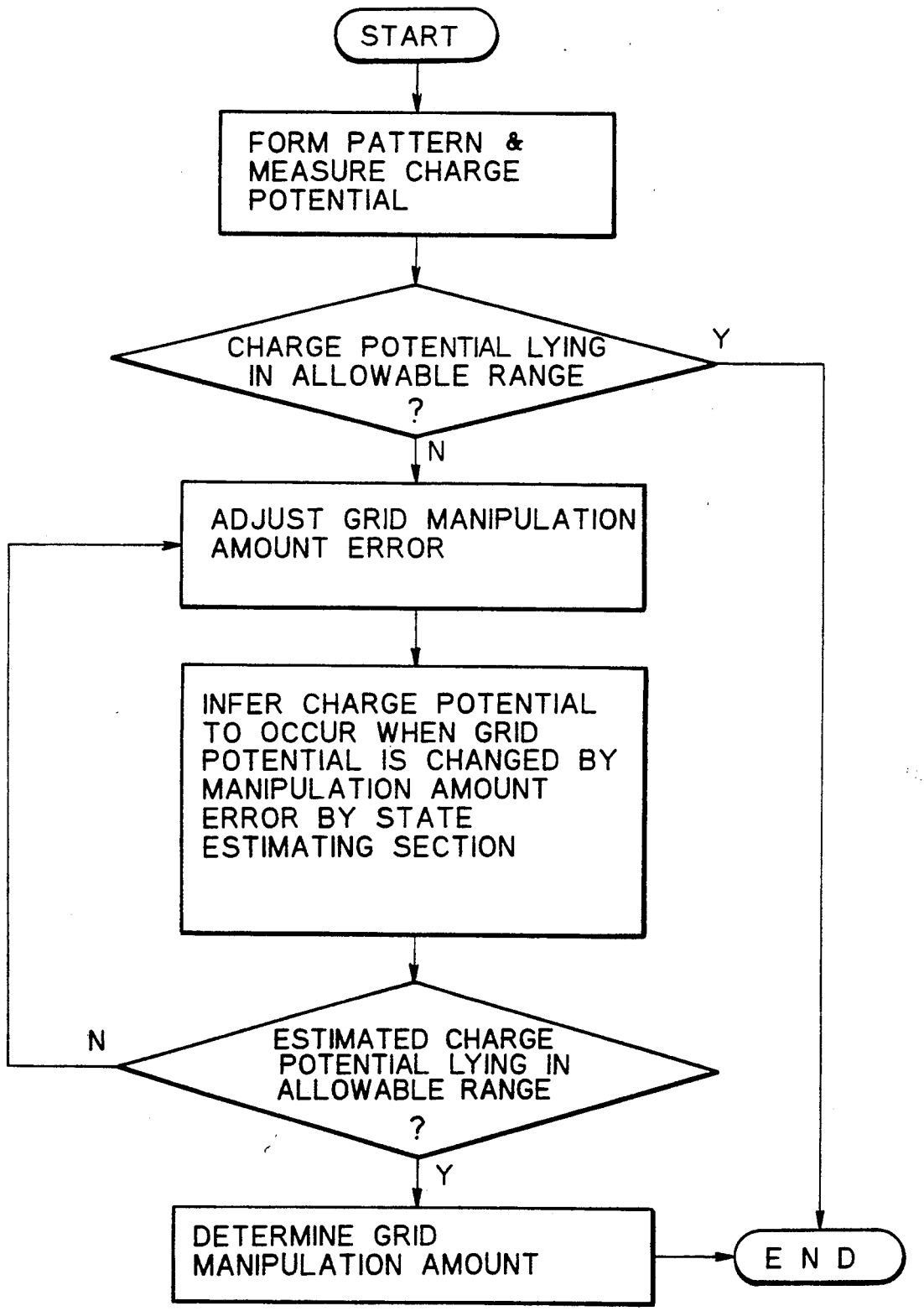
FIG. 8 is a flowchart demonstrating a specific operation of the neural network for determining a manipulation amount.

The operation will be described more specifically by taking the control over the surface potential of a photoconductive element in a charging station as an example. The subject of control is the voltage to be applied to the grid of a charger. FIG. 7 shows a specific construction of a state estimating section associated with the surface potential and implemented by a three layer hierarchical neural network. FIG. 8 is a flowchart demonstrating a procedure for determining a manipulation amount. First, a reference latent image pattern is formed on the surface of a photoconductive element to measure the charge potential under the present condition. If the difference (state error) between the charge potential under the present condition and the charge potential under a target state is greater in absolute value than an allowable upper limit, the manipulation amount error of the grid voltage is adjusted and, at the same time, the state estimating section is caused to estimate a charge potential which would occur if the grid voltage were changed by the manipulation amount error. The adjustment of the manipulation amount error and the estimation of a charge potential is repeated until the difference (state error) between the estimated charge potential under the estimated state and the charge potential under the target state becomes smaller in absolute value than the allowable upper limit. At the time when the error has fallen in the allowable range, the instantaneous grid manipulation amount is added to the present grid potential and the sum is fed to a driver as a new grid potential.

(2) Learning

The neural network built in the state estimating section 2 performs learning in the following steps (i) and (ii).

Figure 5:
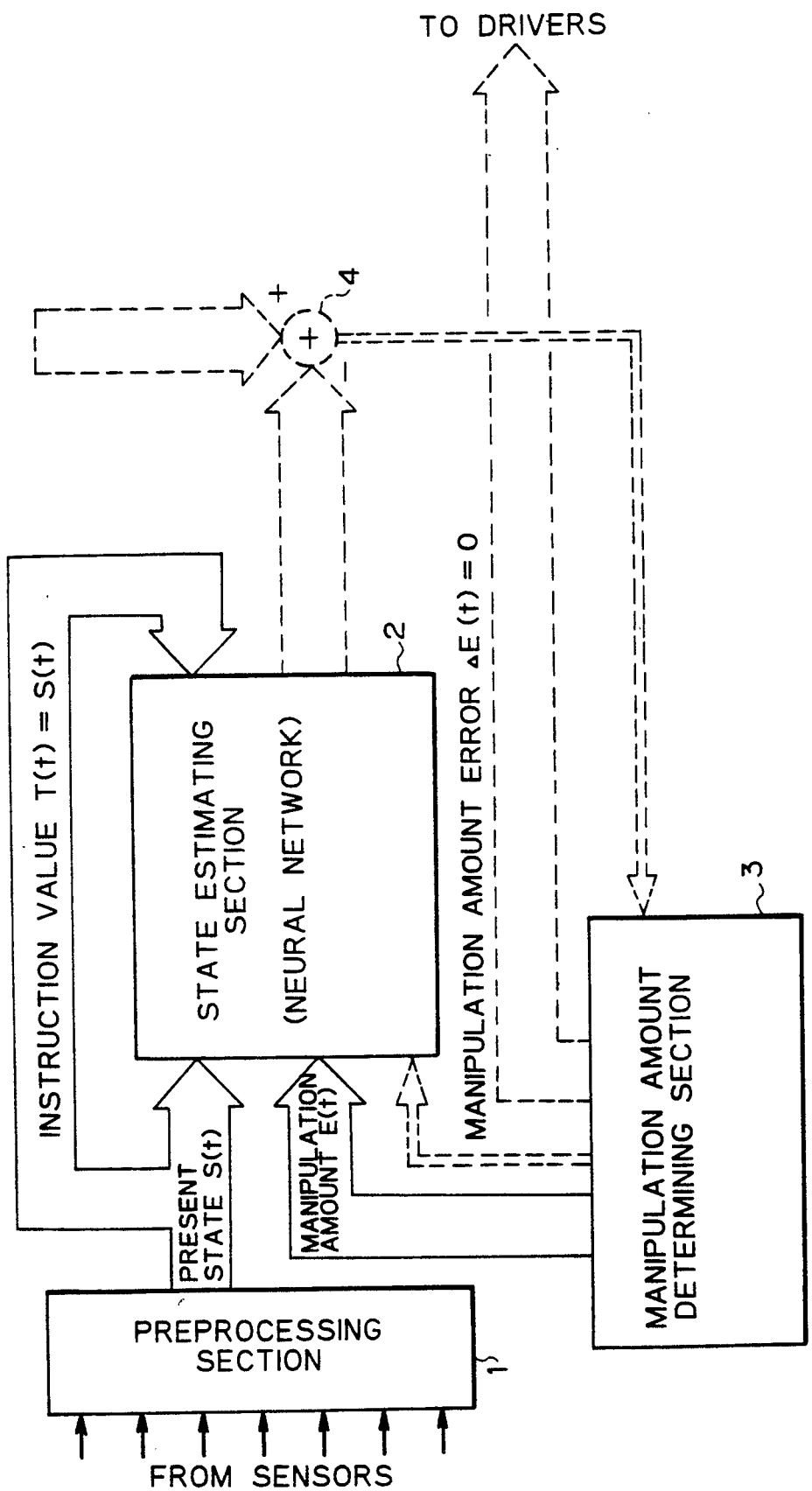
FIGS. 5 and 6 show a learning procedure particular to the embodiment.

(i) Learning present state (see FIG. 5): When the manipulation amount error $\Delta E$ is zero, the estimated state s(t+1) should be equal to the present state S with no regard to the manipulation amount. Therefore, at the time t, the present state S(t), manipulation amount (t) and manipulation amount error $\Delta E(t)=0$ are inputted, and an instruction value $T(t)=S(t)$ is given. In this condition, the neural network performs learning by use of, for example, a back propagation rule.

Figure 6:
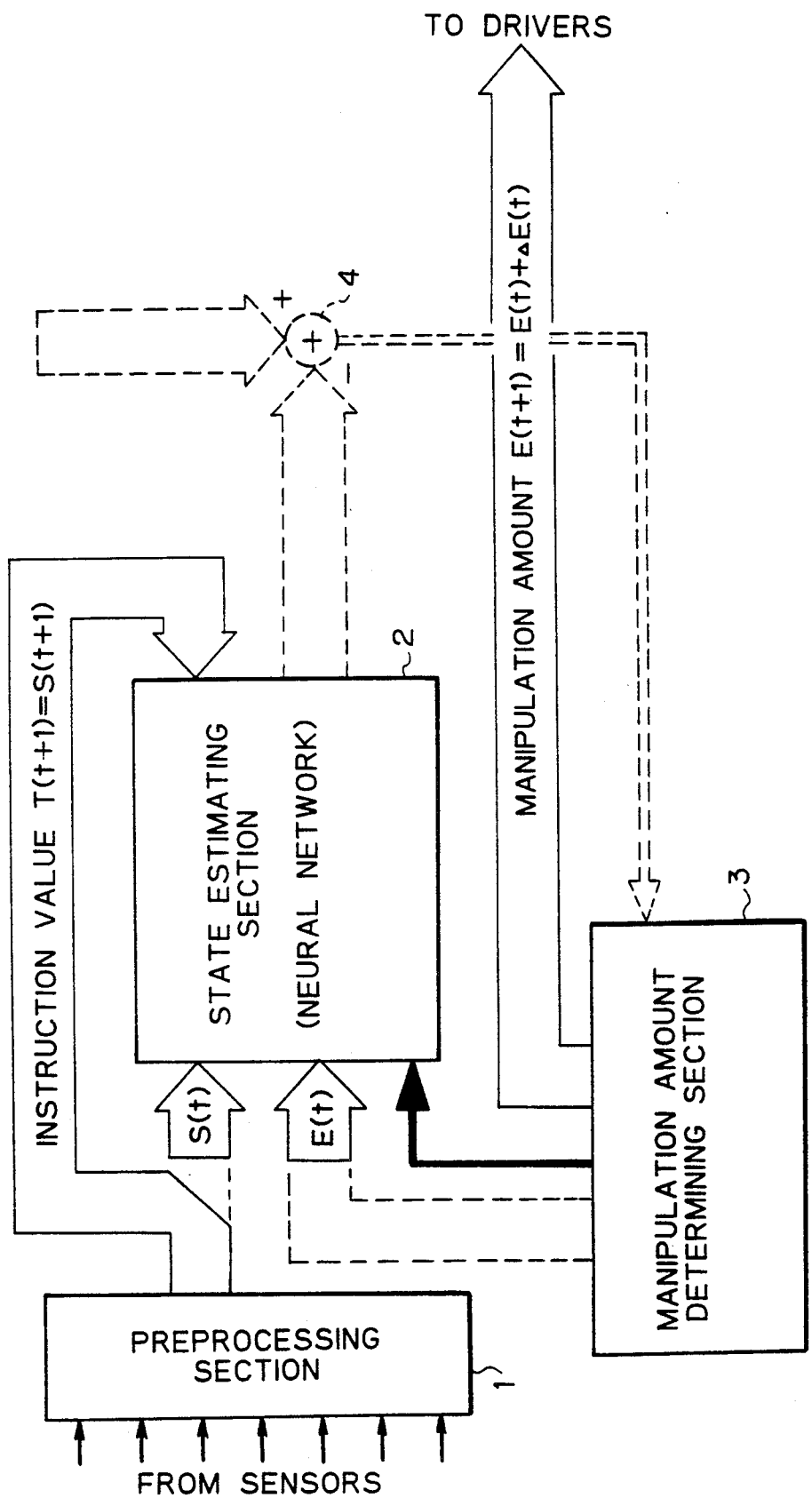

(ii) Learning estimated state (see FIG. 6): To learn the estimation of a state to be brought about by a change $\Delta E(t)$ of manipulation amount, the present image forming state S(t), manipulation amount E(t) for each driver, and manipulation amount error $\Delta E(t)$ at the time t are fixed as inputs. Subsequently, the manipulation amount determining section 3 generates a new manipulation amount $E(t+1)=E(t)+\Delta E(t)$ and sends it to each driver. The various sections (grid, light source, etc.) are controlled on the basis of the resulting manipulation amounts sent from the drivers. On receiving the outputs of the sensors representative of new internal and external states of the apparatus, the preprocessing section 1 generates a state S(t+1). Thereafter, the neural network performs learning with an instruction value $T(t+1)=S(t+1)$.

Figure 9:
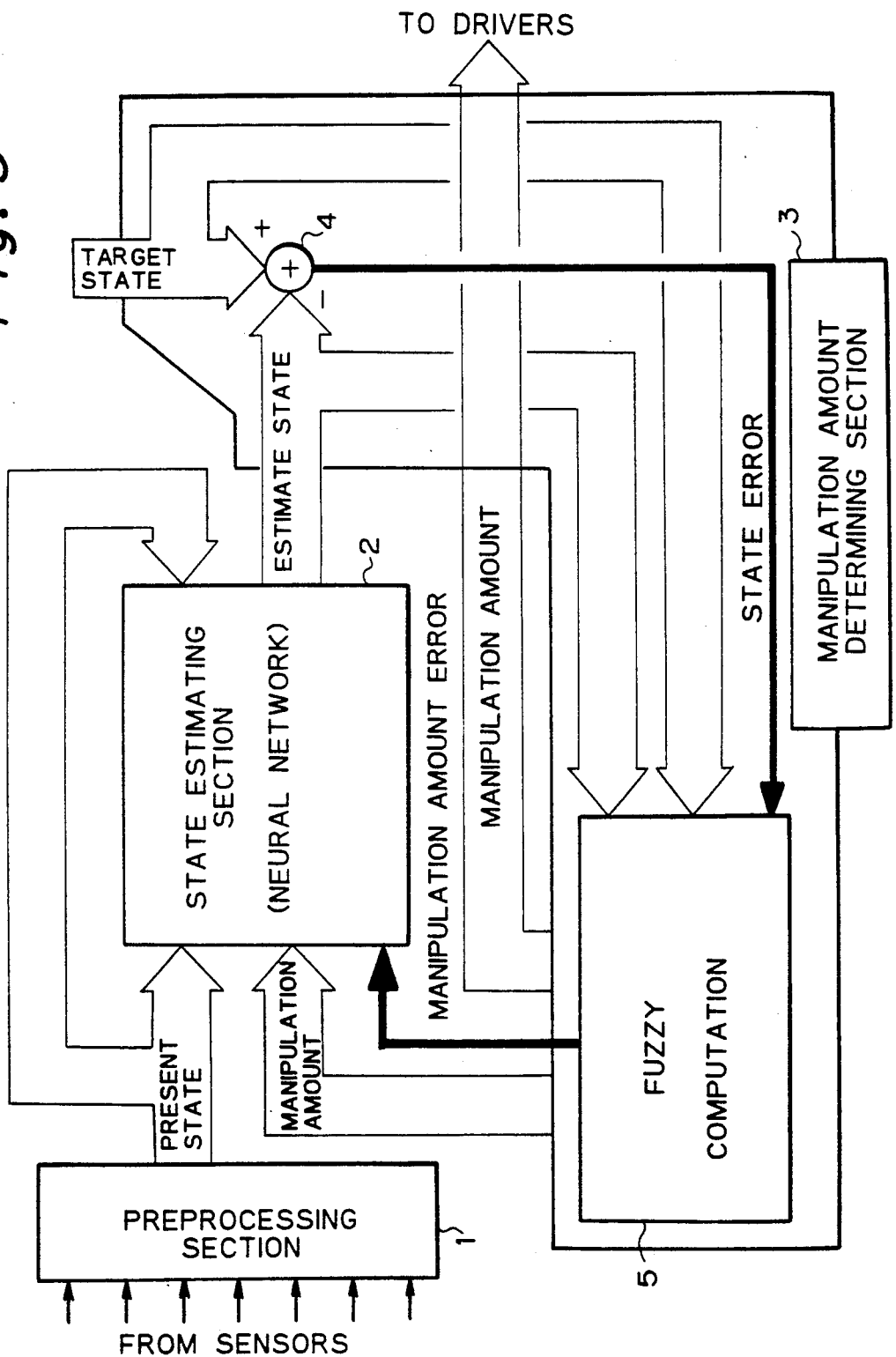
FIG. 9 is a block diagram showing an alternative embodiment of the present invention.

Referring to FIG. 9, an alternative embodiment of the present invention is shown. In this embodiment, the manipulation amount determining section 3 and state comparing section 4 of the previous embodiment are replaced with a manipulation amount determining section 3 having a fuzzy computing device therein. The manipulation amount determining section 3 is made up of the state comparing section 4 and a fuzzy computing device 5.

The operation of the embodiment shown in FIG. 9 is as follows.

(1) Control

Basically, the operation of this embodiment is similar to that of the previous embodiment, except for the following points. The manipulation amount determining section 3 performs fuzzy computation by using one or more of the state error e, estimated state s(t+1), and target state Si, generates a manipulation amount error ΔE(t) which reduces the absolute value of the state error e, and feeds it to the state estimating section 2 (as in the step (v) of the previous embodiment). Assume that in the manipulation amount determining section 3 one or more of the state error e, estimated state s(t+1) and target state Si is input to the fuzzy computing device 5, and that a rule for generating a manipulation amount error ΔE(t) and membership functions for the fuzzy/non-fuzzy conversion of input and output parameters determined by experiments are loaded in the device 5.

(2) Learning

The neural network built in the state estimating section 2 performs learning in exactly the same manner as in the previous embodiment.

Figure 10:
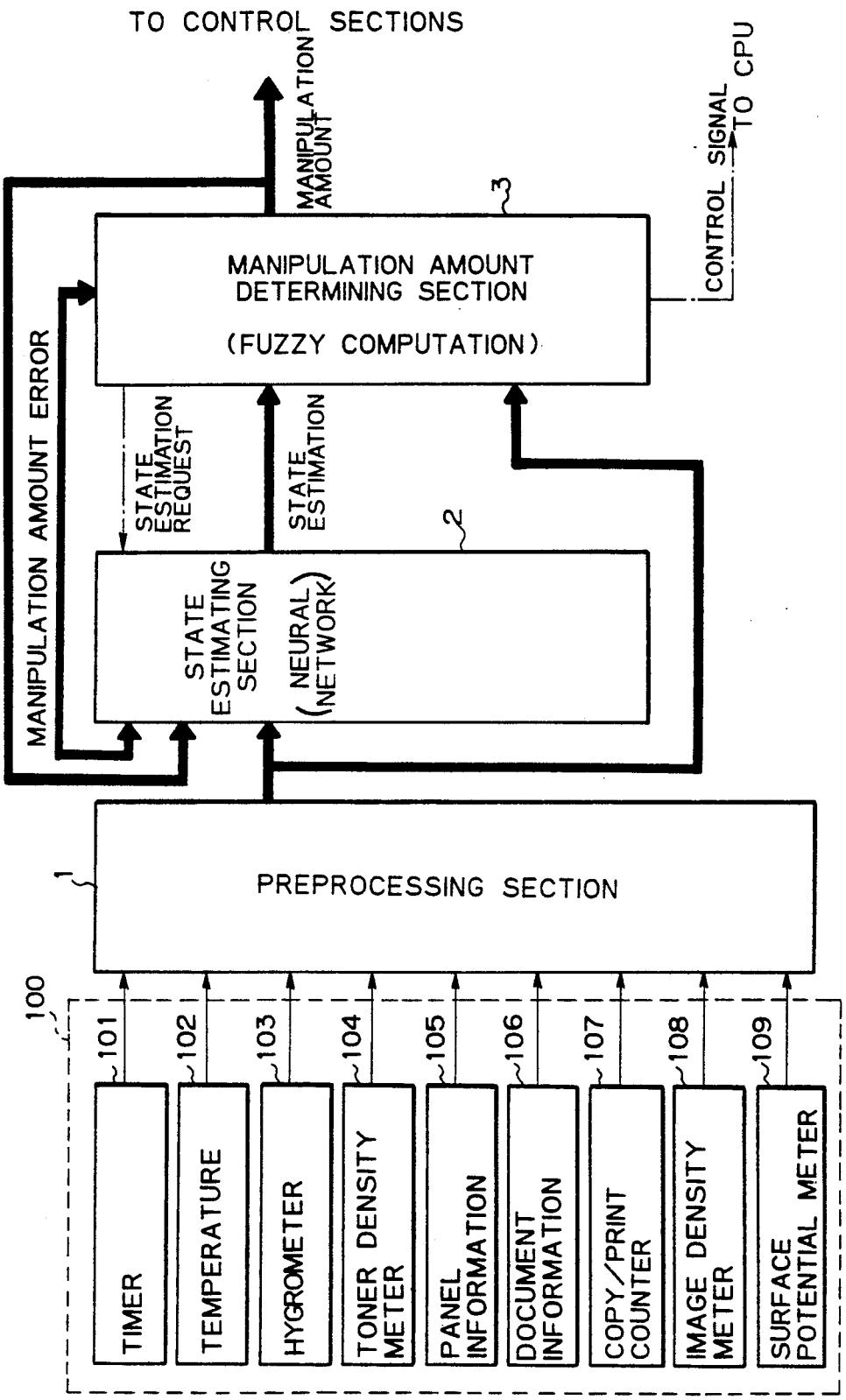
FIG. 10 is a block diagram showing another alternative embodiment of the present invention.

Referring to FIG. 10, another alternative embodiment of the present invention will be described. In FIG. 10, a sensor section 100 is shown in addition to the preprocessing section 1, state estimating section 2, and manipulation amount determining section 3. The sensor section 100 includes a timer 101, a thermometer 102, a hygrometer 103, a toner concentration meter 104, a copy/print counter 107, a image density meter 108, a surface potential meter 109 and other measuring means, operation panel information 105, and document information 106. The preprocessing section 1 converts the outputs of the sensor section 100 to a format which can be input to the state estimating section 2 and manipulation amount determining section 3 by, for example, analog-to-digital (AD) conversion. A fuzzy computing device is built in the manipulation amount determining section 3 for controlling the state estimating section 2 and generating a manipulation amount to be sent to the control section of each section constituting a copier or similar image forming apparatus. A neural network is incorporated in the state estimating section 2. The neural network receives the present state, manipulation amount and manipulation amount error and outputs a state which would occur if the manipulation amount were changed by the manipulation amount error under the present condition, thereby estimating a state. In the illustrative embodiment, the neural network is provided with instruction values in the form of parameters which are representative of a state determined by experiments, and it has learned the characteristics of the system beforehand.

Figure 11:
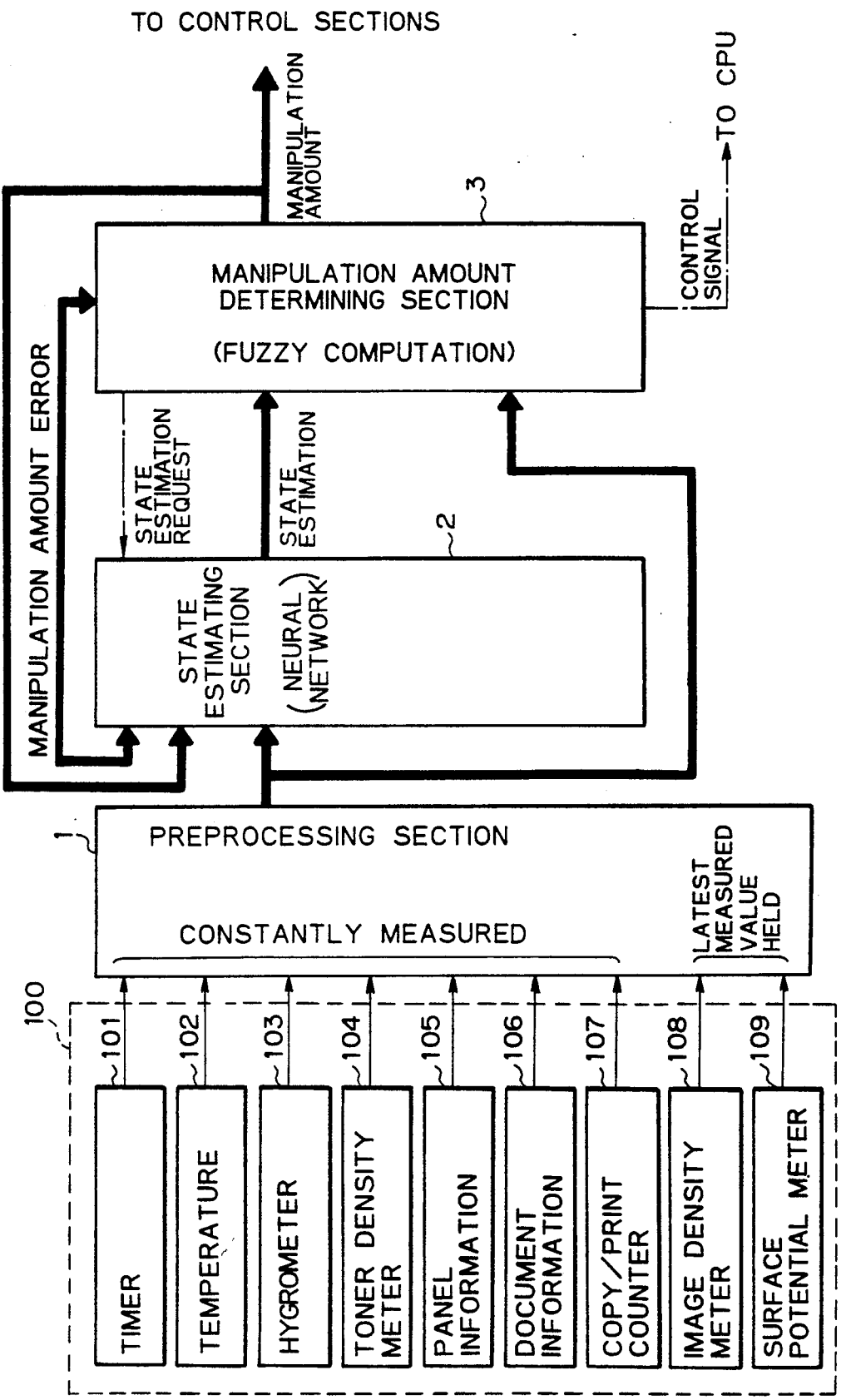
FIG. 11 is a block diagram representative of a specific operation of the embodiment shown in FIG. 10.

The operation of this embodiment will be described with reference to FIG. 11. Measured values and information from the sensor section 100 are converted by the preprocessing section 1 to a format which can be input to the state estimating section 2 and manipulation amount determining section 3. The parameters sent from the sensors 100 and converted by the preprocessing section 1 are classified into a group A obtainable by real-time measurement (i.e. without interrupting the process) and a group B unobtainable by real-time processing, i.e., unmeasurable unless the process is interrupted. The parameters belonging to the group A are the outputs of the timer 101, thermometer 102, hygrometer 103, toner density meter 104, panel information 105, document information 106 (in the case of a printer and digital copier only), and copy/print counter 107. The parameters belong to the group B are the outputs of the image density meter 108 and surface potential meter 109. The parameters of group A are constantly measured on a real-time basis. Regarding the group B, the values measured last time are held and fed to the manipulation amount determining section 3. The manipulation amount determining section 3 calculates a manipulation amount to be sent to each control section of a copier or similar image forming apparatus by using predetermined membership functions based on the parameters which are fed from the preprocessing section 1.

Figure 12:
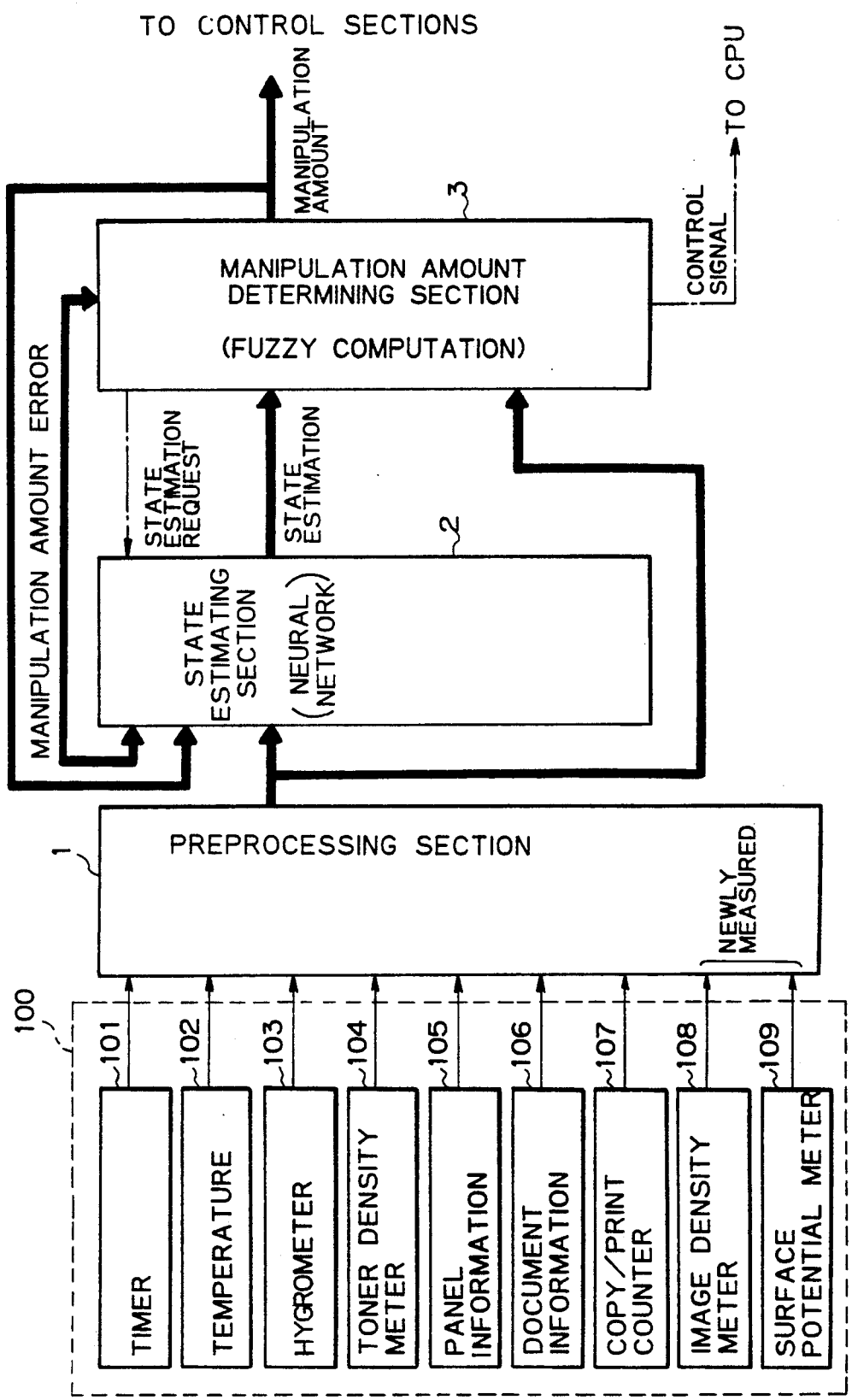
FIG. 12 is a block diagram showing another specific operation of the embodiment shown in FIG. 10.

On the other hand, when manipulation amounts have to be changed due to various conditions (e.g. change in the state of the image forming unit), a procedure shown in FIG. 12 and including the following steps (i)-(v) is executed.

(i) The manipulation amount determining section 3 sends a request to a central processing unit (CPU), which governs the entire apparatus, for interrupting the process and measuring the parameter group B.

(ii) Then, the manipulation amount determining section 3 sends an operation amount error and a state estimation request to the state estimating section 2, causing it to estimate a state.

(iii) By using the neural network having learned the system by, for example, experiments, the state estimating section 2 estimates a state of the image forming unit which would occur if the present manipulation amount were changed by the manipulation amount error, on the basis of the parameters from the preprocessing section 1 and the present manipulation amount and manipulation amount error parameters from the manipulation amount determining section 3. As a result, the state estimating section 2 generates state parameters and feeds them to the manipulation amount determining section 3.

(iv) The manipulation amount determining section 3 compares the state parameters from the state estimating section 2 with the target state and, if the former does not coincide with the latter, changes the state error parameters and then executes the steps (ii) and (iii) again.

(v) The above steps (i)-(iv) are repeated until the estimated state converges to the target state. At this instant, the state error is changed by fuzzy computation using the manipulation amount error and predetermined membership functions relating to the change in the estimated state relative to the manipulation amount error and/or the external and internal states of the image forming unit.

A manipulation amount error produced when the estimated state coincided with the target state is used as an actual change in the manipulation amount, whereby a new manipulation amount is determined.

On the other hand, when the neural network incorporated in the state estimating section 2 is required to repeat learning due to various conditions (e.g. estimation error and user's command), it performs learning in the following steps (i) and (ii).

(i) Learning present state: When the manipulation amount error is zero, the estimated state should be equal to the present state with no regard to the manipulation amount. Hence, the neural network performs learning in response to the present state, manipulation amount, and manipulation amount error (=0) and by using the present state as an instruction value.

(ii) Learning estimated state: When the manipulation amount is changed by the manipulation amount error, the neural network performs learning, as follows. First, the state, manipulation amount and manipulation amount error are fixed as inputs. Then, each of the various sections of the image forming unit (e.g. grid and light source) are controlled on the basis of a new manipulation amount (=present manipulation amount- +manipulation amount error). Thereafter, the state estimating section 2 receives new internal and external states of the apparatus from the sensor section 100 via the preprocessing section 1, causing the neural network to learn using the instantaneous state as an instruction value.

Figure 13:
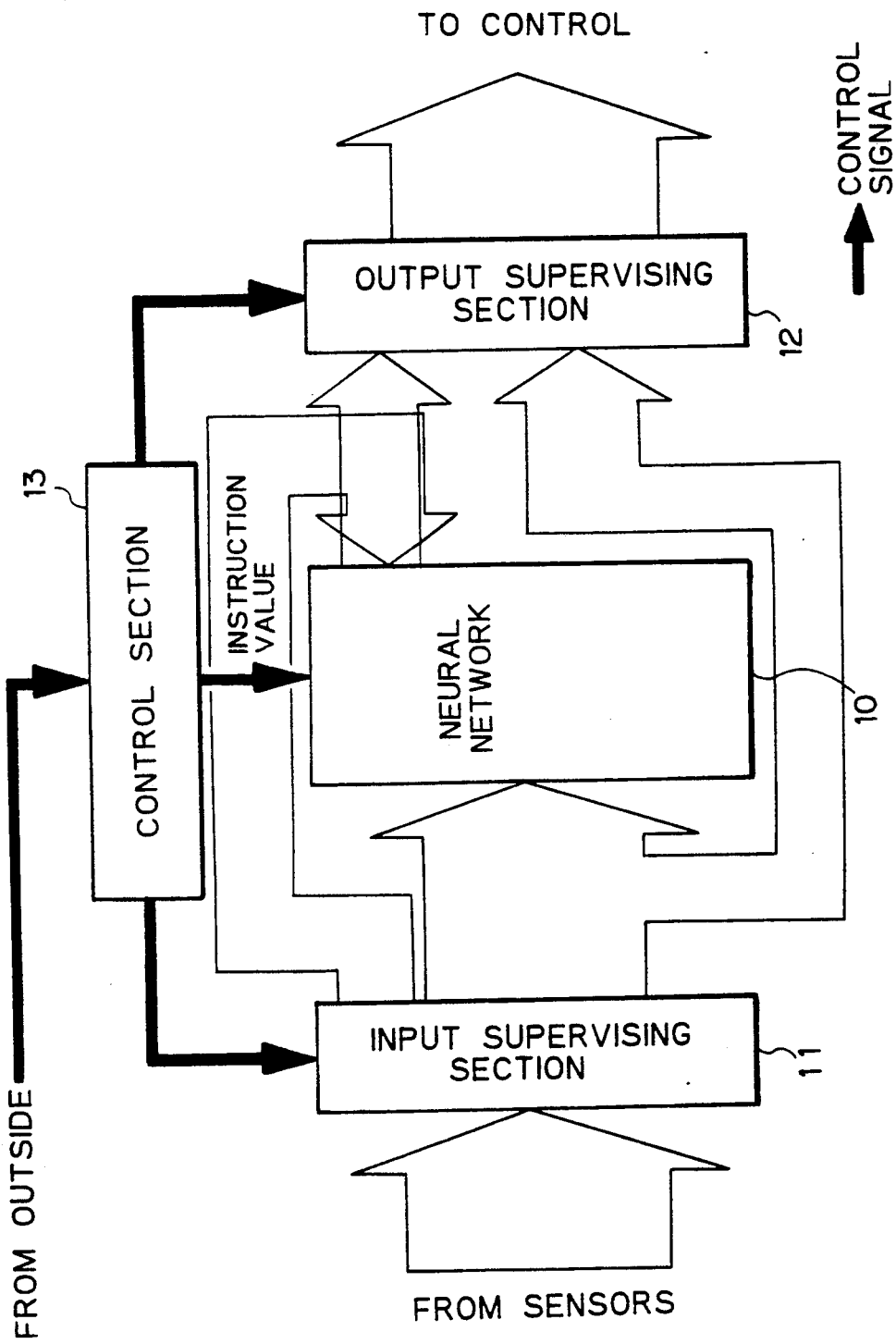
FIG. 13 is a block diagram showing a specific construction of a preprocessing section included in an electrophotographic process control device in accordance with the present invention.

FIG. 13 shows a basic construction of the preprocessing section 1. As shown, the preprocessing section 1 has a neural network 10 constituting state inferring means for inferring unmeasurable values, an input supervising section 11 for transferring the outputs of the sensors to the neural network 10, an output supervising section 12 for transferring the estimated values from the neural network 10 to the control device, and a control section 13 for processing requests sent from the outside and controlling the supervising sections 11 and 12 and neural network 10. The neural network 10 receives measurable values and substitutes for unmeasurable values (substitutes are measurable) and in turn outputs desired unmeasurable values. It is to be noted that the neural network 10 uses unmeasurable values determined by experiments beforehand as instruction values and has performed learning by a method which will be described.

The operation of the preprocessing section 1 shown in FIG. 13 is as follows.

(1) Operation in Copier/Printer or Similar Image Forming Apparatus

Figure 14:
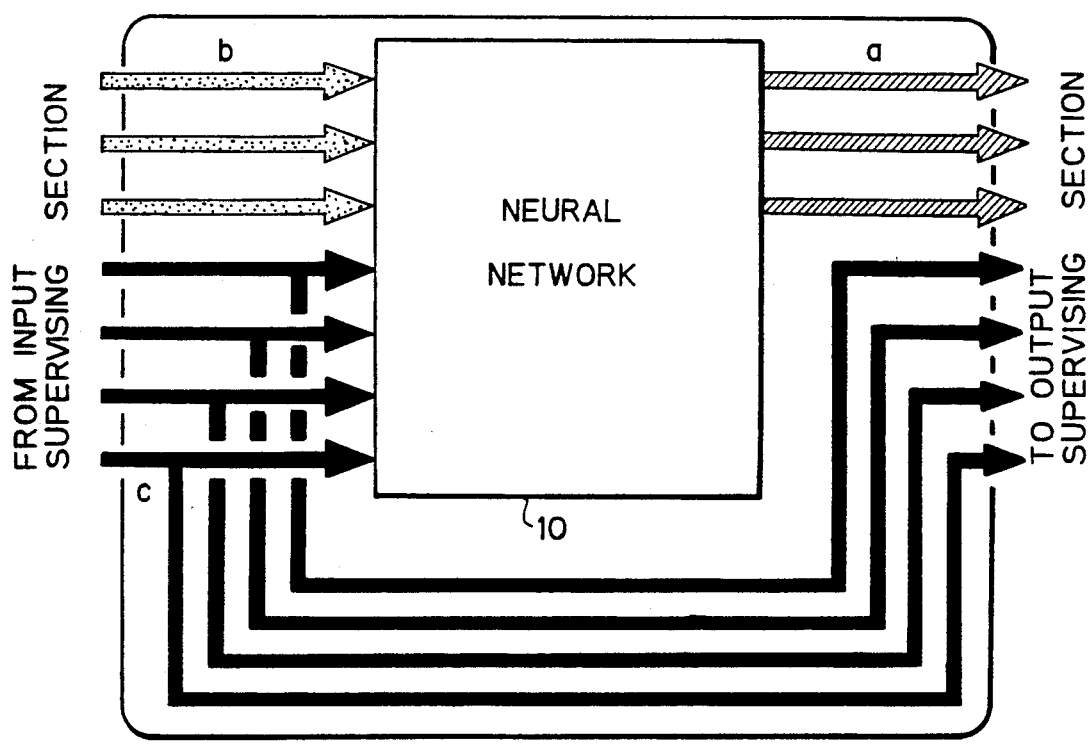
FIG. 14 shows a specific operation of a neural network included in the preprocessing section of FIG. 13.
Figure 15A:
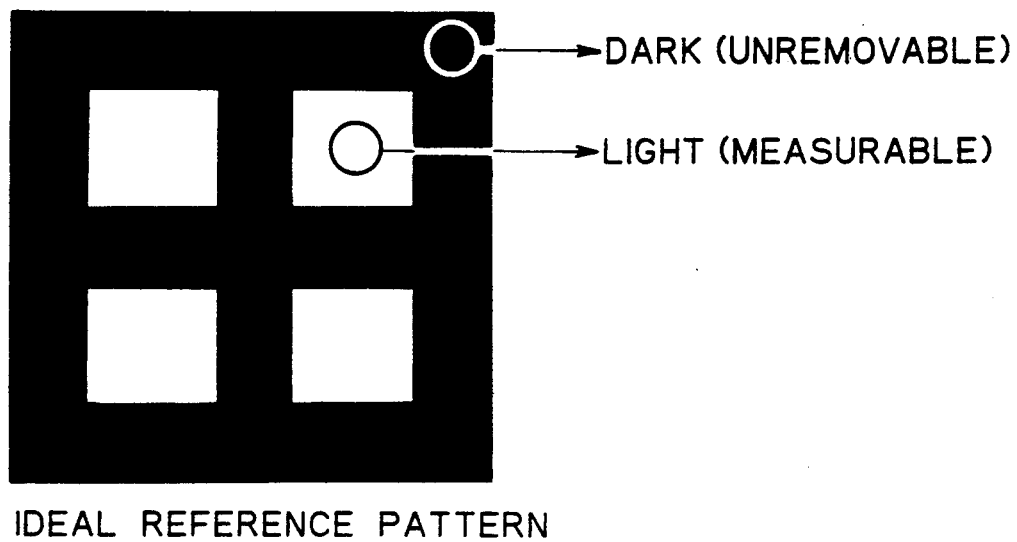
FIGS. 15A and 15B each shows a specific reference pattern applicable to the measurement of a surface potential and an amount of toner deposition.
Figure 15B:
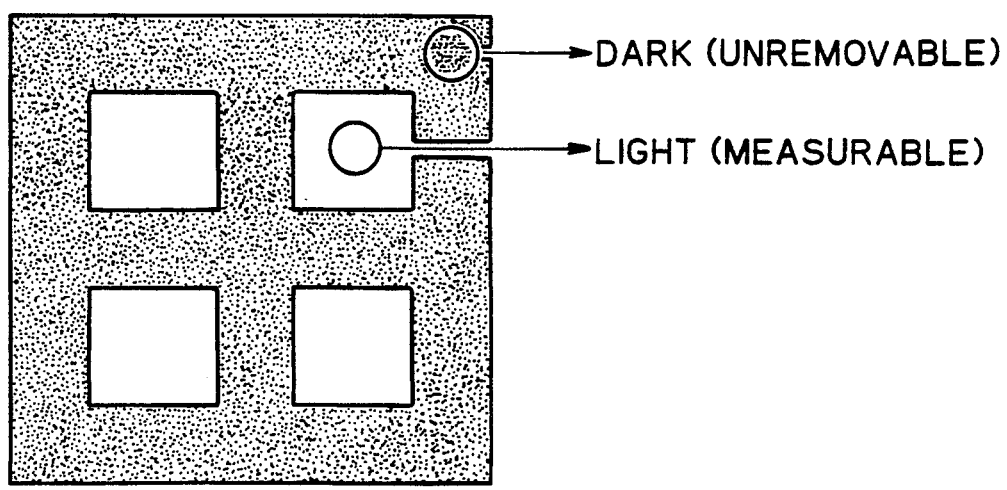

While the following description concentrates on the measurement of the surface potential of a photoconductive drum for simplicity, it is also true with the measurement of the amount of toner deposition. FIG. 14 demonstrates the operation of the neural network 10 incorporated in the preprocessing section 1. FIGS. 15A and 15B each show a specific reference pattern for measuring the surface potential of a photoconductive element and the amount of toner deposition. Specifically, FIG. 15A shows an ideal reference pattern having a density difference similar to that of an actual document. It is desirable to measure the surface potential and the amount of toner deposition in the light and dark portions of the ideal reference pattern. In practice, however, such an ideal pattern cannot be used since the amount of toner to deposit on the dark portion is too great to be fully removed by cleaning. It is necessary, therefore, to form a reference pattern shown in FIG. 15B which is lower in density than the ideal reference pattern, measure the surface potential and the amount of toner deposition in the light and dark portions of such a reference pattern, and then infer the desired value of the dark portion on the basis of the actually measured values. In FIG. 14, in response to a request from the control section 13, the neural network 10 infers a desired unmeasurable value (surface potential of the reference pattern of FIG. 15A) by using the substitute value from the input supervising section 11 (surface potential of the dark portion of FIG. 15B) and measurable values (temperature, humidity and other environmental factors), delivering the inferred value to the output supervising section 12.

(2) Learning

Figure 16:
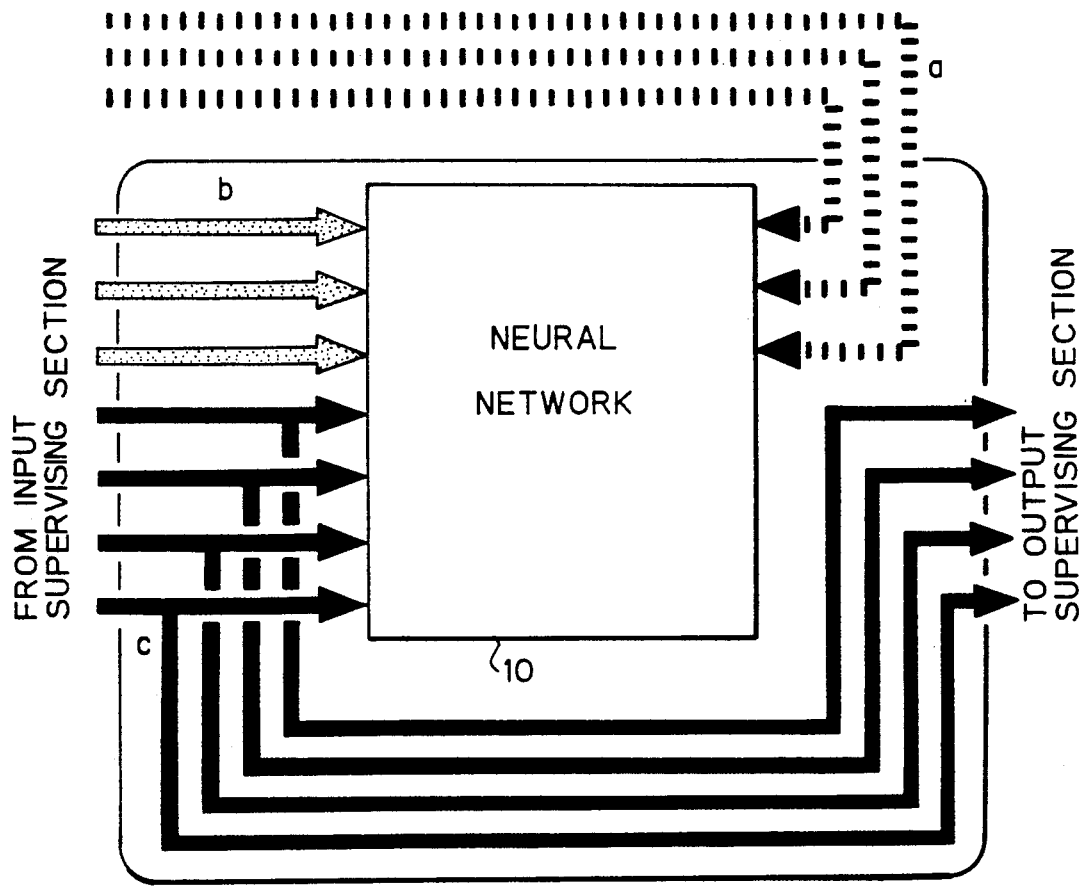
FIG. 16 demonstrates a specific learning procedure particular to the neural network of the preprocessing section shown in FIG. 13.

FIG. 16 is representative of the learning procedure of the network 10. In this case, both of the reference patterns shown in FIGS. 15A and 15B are formed at the same time, and their surface potentials are measured. The neural network 10 receives the substitute value sent from the input supervising section 11 (surface potential of the dark portion of the pattern shown in FIG. 15B) and measurable values (e.g. temperature), uses a value measured only in the event of learning (surface potential of the dark portion of the pattern shown in FIG. 15A) as an instruction value, and learns a relation between the substitute value (surface potential of the dark portion of FIG. 15B) and the desired value (surface potential of the dark portion of FIG. 15A) under various environments while suitably changing the temperature, humidity and other environmental factors.

As stated above, the neural network, or state inferring means, 10 learns the characteristics of the system of the apparatus with instruction values which are the parameters representative of states determined by, for example, experiments beforehand. Therefore, the embodiment is capable of generating, after a target state has been set up, parameters representative of a state in a target state by the state inferring means in response to the outputs of means for measuring the internal and external states of the apparatus, e.g., the surface potential of a photoconductive drum, the amount of toner deposition, temperature, and humidity. Therefore, various portions of the electrophotographic process can be controlled in an optimum way on the basis of such parameters.

In summary, the present invention provides an electrophotographic process control device having various unprecedented advantages, as enumerated below.

(1) The control device is capable of controlling various sections of an image forming apparatus more delicately in matching relation to the varying state of the apparatus than a conventional manipulation amount determining system which uses look-up tables. This not only insures higher image quality than conventional but also eliminates faulty images, e.g., images with smeared background, local omission, or short density.

(2) The control device measures the surface potential, toner concentration or similar factor only once per control. Hence, the control device reduces the number of times that a developed reference pattern has to be removed and, therefore, reduces the load acting on a cleaning section, compared to a conventional method which determines a manipulation amount by forming a reference pattern repetitively. This is successful in increasing the life and reliability of the apparatus.

(3) Even when the characteristics of an image forming apparatus differ from one machine to another or when a system which is difficult to estimate changes due to, for example, aging to such an extent that the estimated state differs from the actual state, all that is required is to cause a neural network to perform learning again to thereby introduce the change in the characteristics in a state estimating section. The control device, therefore, desirably follows changes due to aging to insure optimum control at all times.

(4) With the PID control algorithm or similar conventional algorithm, it is difficult to converge the estimated state from the state estimating section to a target value on the basis of a plurality of manipulation amount errors which depend on one another in a complicated way. By contrast, the control device of the invention produces a state difference by use of fuzzy computation and, therefore, can promote rapid convergence of the estimated state while increasing the process speed of the apparatus itself.

(5) The control device allows the state estimating section thereof to be constructed by a minimum number of experiments due to the generalization capability of a neural network. That is, a state estimating function can be implemented by an extremely small number of state combinations of an apparatus ascribable to temperature, humidity and other environmental factors and manipulation amounts and other parameters meant for various drivers included in the apparatus. This noticeably reduces the time and cost for development, compared to the look-up scheme or similar conventional scheme which needs a prohibitive amount of experiments for determining all the possible combinations parameter by parameter and has to hold a prohibitive number of tables in the apparatus.

Various modifications will become possible for those skilled in the art after receiving the teachings of the present disclosure without departing from the scope thereof.

What is claimed is:

1. An image forming process control device for determining an optimum manipulation amount for image formation in an image forming apparatus, comprising:
   measuring means for measuring the state of each section of said image forming apparatus;
   preprocessing means for converting information fed from said measuring means to parameters representative of a given state, said information fed from the measuring means including continuously detected real-time measurements of operating conditions of at least one of the sections of said image forming apparatus, and substitute values representing operating conditions of at least one other section of said image forming apparatus, wherein the operating conditions of said at least one other section of the image forming apparatus are only measured upon an interrupt in processing;
   state estimating means comprising a neural network having performed predetermined learning beforehand, said state estimating means receiving said parameters and information relating to a manipulation amount at an input layer of said neural network and outputting an estimated state of a particular section of said image forming apparatus via an output layer of said neural network;
   state comparing means for comparing an output of said state estimating means with a target state of said particular section; and
   manipulation amount determining means for producing a deviation of a manipulation amount from the present manipulation amount on the basis of an output of said state comparing means, delivering said deviation to said state estimating means, and adding, when the result of comparison has converged, said deviation to the present manipulation amount to thereby produce an optimum manipulation amount.

2. A control device as claimed in claim 1, further comprising fuzzy computing means for determining a manipulation amount of each section of said image forming apparatus by fuzzy computation.

3. An electrophotographic process control device for an image forming apparatus which forms an image by an electrophotographic process, comprising:
   measuring means for measuring the internal and external states of said image forming apparatus;
   preprocessing means for converting the internal and external states from said measuring means and manipulation amount information associated with the interior of said image forming apparatus to parameters representative of a state of said image forming apparatus;
   state estimating means for inferring a state of said image forming apparatus by a neural network which receives said parameters and has learned the characteristics of a system of said image forming apparatus beforehand by use of parameters determined by experiments as instruction values;
   state comparing means for comparing the state inferred by said state measuring means and a target state for control; and
   manipulation amount determining means for determining an optimum manipulation amount for each section of said image forming apparatus,
   wherein said internal and external states of the image forming apparatus includes continuously detected real-time measurements of operating conditions of at least one section of the apparatus and substitute values representing operating conditions of at least one other section of the apparatus which are only measured upon an interrupt in processing.

4. A control device as claimed in claim 3, further comprising fuzzy computing means for determining a manipulation amount of each section of said image forming apparatus by fuzzy computation.

5. An image forming apparatus for forming an image by an electrophotographic process, comprising:
   preprocessing means for measuring the internal and external states of said image forming apparatus and converting the resulting information to parameters representative of a state,
   wherein said internal and external states of the image forming apparatus include continuously detected real-time measurements of operating conditions of at least one section of the apparatus and substitute values representing operating conditions of at least one other section of the apparatus which are only measured upon an interrupt in processing;
   state estimating means comprising a neural network which has learned the characteristics of a system of said image forming apparatus by use of parameters representative of states of the image forming apparatus determined by experiments as instruction values; and
   manipulation amount determining means for determining a manipulation amount to be sent to each control section, which controls an associated section of said image forming apparatus, by fuzzy computation using a state estimated by said state estimating means, parameters representative of the internal and external states of said image forming apparatus, information from an operation panel of said image forming apparatus and a present manipulation amount.

6. An electrophotographic process control device for an image forming apparatus which forms an image by an electrophotographic process, comprising:
   state estimating means comprising a first neural network which has learned the characteristics of a system of said image forming apparatus beforehand by use of parameters representative of states determined by experiments as instruction values; and preprocessing means, including a second neural network, for measuring, in a state other than a target state, the internal and external states of said image forming apparatus and producing parameters representative of a state in said target state by using said state estimating means on the basis of substitute values and the measured internal and external states.

7. The control device as claimed in claim 6, wherein the measured internal and external states represent continuously detected real-time measurements of operating conditions of at least one section of the image forming apparatus, and said substitute values represent operating conditions of at least one other section of the image forming apparatus, the operating conditions of said at least one other section of the image forming apparatus being measured only upon an interrupt in processing.

8. The control device as claimed in claim 7, wherein the preprocessing means further comprises an input supervising section for receiving outputs of said measuring means and for transferring said outputs to said second neural network.

9. The control device as claimed in claim 8, wherein the preprocessing means further comprises an output supervising section for transferring unmeasurable values output from the second neural network to the state estimating means.

* * * * *